S. R. PARKHURST.
COTTON GIN.
No. 98,705.                      Patented Jan. 11, 1870.
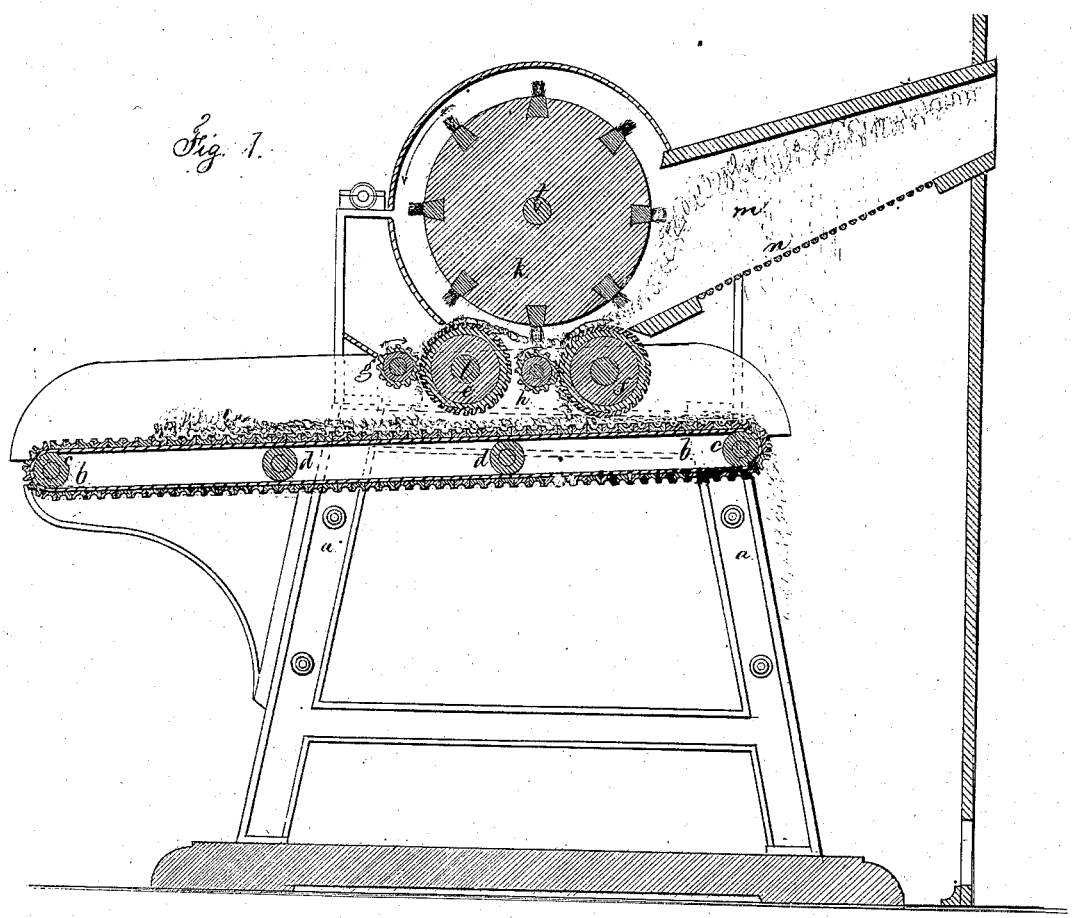
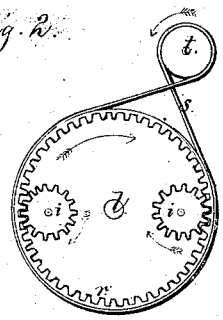

United States Patent Office.

STEPHEN R. PARKHURST, OF MONT CLAIR, NEW JERSEY, ASSIGNOR TO EMILY R. PARKHURST AND WARREN H. HOLT, OF SAME PLACE.

Letters Patent No. 98,705, dated January 11, 1870.

IMPROVEMENT IN COTTON-GINS.

The Schedule referred to in these Letters Patent and making part of the same.

*To all whom it may concern:*

Be it known that I, STEPHEN R. PARKHURST, of Mont Clair, in the county of Essex, and State of New Jersey, have invented and made a new and useful Improvement in Cotton-Gins; and I do hereby declare the following to be a full, clear, and exact description of the said invention, reference being had to the annexed drawing, making part of this specification, wherein—

Figure 1 is a vertical section of said gin, transversely of the cylinder and blower.

Figure 2 is a view of the gearing that is employed for driving the strippers.

Similar marks of reference denote the same parts.

Heretofore, it has been usual, in cotton-gins, to provide a hopper, in which the roll of cotton revolves, and from the surface of which the seeds fall, when sufficiently clean. It is difficult to feed a gin in such a manner as to prevent the roll "breaking up" and ceasing to revolve with uniformity, and when this happens, the machine is liable to injury, or else the seeds do not free themselves, but are broken up and pass through with the cotton.

My invention is devised with the object in view of making the ginning-operation continuous, and preventing the seeds intervening between the surface of the cotton and the ginning-cylinder, thus greatly facilitating the ginning-operation, and lessening the risk of the seeds being broken or cut, and of the pieces passing away with the cotton.

I make use of a feeding-belt that supplies the cotton to the ginning-cylinder, and runs under the said cylinder, so that the seeds fall thereon, and are sustained to be taken up again, if there is cotton adhering thereto, and if not, the seeds are conveyed away by the belt.

In the drawing—

$a$ represents the frame of the machine, of any usual character.

$b$ is the feeding-apron, formed of endless belts carrying slats, with grooves in the surfaces of the slats, sufficiently deep for the cotton-seeds to be received.

This belt of slats passes around the end rollers $c\ c$, to one of which a belt or other device for moving the same is applied, and I prefer, also, to use supporting-rollers $d\ d$.

The ginning-cylinders $e$ and $f$ are sustained in suitable bearings upon the frames $a$, and so also are the stripping-rollers $g\ h$, and blower $k$.

The parts are arranged, so that the cylinder $e$ is not as close to the belt $b$ as the cylinder $f$, in order that the cotton may be principally ginned by the cylinder $e$, and the portions that may not be entirely ginned are taken by the cylinder $f$.

By this arrangement, the ginning-operation is facilitated, the labor being divided between two cylinders, and the cylinder $f$ thoroughly frees the seeds from any cotton, and the seeds pass on and fall from the belt or apron $b$, as it passes around back roller $c$.

I prefer to have longitudinal grooves in the slats forming the belt or apron $b$, so that the cotton-seeds may fall into them when cleaned; and in order to allow any pods or other large foreign substances to pass out from between the belt and cylinders $e\ f$, I prefer to fit the back roller $c$, so as to be raised and lowered by levers, or otherwise. I thus provide for adjusting the space between the cylinders and the belt, to prevent the cotton escaping with the seeds, and also to allow obstructions to pass out when the belt and back roller are lowered.

The strippers $g\ h$ revolve in the direction indicated, so that they act to roll back the lumps of cotton and seeds, as now usual.

The cylinders $e\ f$ are cleaned from cotton by the brush-blower $k$ that throws the cotton away through the trunk $m$, and over the screen $n$, which allows dust or small particles to fall away.

I prefer that the brush-blower shall be made of fine wires, introduced with the bristles, to prevent the cotton being curled or rolled up as it is taken off the cylinders $e\ f$ by the brushes of the blower.

Upon the shafts of the strippers $g\ h$, at one end, the pinions $i\ i$ are fitted, and these come within the internal or female gear $r$ that is upon the shaft $l$ of the ginning-cylinder $e$, so that both strippers, $g\ h$, will be driven by one internal gear-wheel. This insures the rotation of both strippers so long as the ginning-cylinder is revolved.

I prefer that the motive-power be belted to the shaft $l$, and that the exterior of the internal gear $r$ be employed as a pulley for the belt $s$ that drives the blower $k$, and the cylinder $f$ may be driven by a separate belt.

This construction and arrangement of strippers, cylinders, and blower, insure a very perfect ginning-operation, and enables me to make use of ginning-cylinders of different sizes, so that the tooth-steel rings forming the cylinders can be cut out from sheet-steel concentrically, and thereby save stock and lessen the cost.

One stripper and cylinder might be used with the belt passing below both, but I prefer to use two cylinders and two strippers, as shown.

The stripper of a cotton-gin has been driven by an internal gear, as shown in Letters Patent granted to me, April 27, 1858.

What I claim, and desire to secure by Letters Patent, is—

1. Arranging the feeding-apron of a cotton-gin, in such relation to the ginning-cylinder and stripper, that the seeds will be thrown down upon said apron, and carried beneath the under side of the cylinder, so that any fibres may be taken from said seeds before their delivery from the apron, substantially as set forth.

2. The endless feeding-belt or apron $b$, arranged as shown beneath the ginning-cylinders, and passing around rollers $c\ c$, in combination with two toothed cylinders, two strippers, and a brush-blower, substantially as and for the purposes set forth.

3. The feeding-apron, formed with slats that are grooved longitudinally for the cotton-seeds to fall into, as set forth.

4. Arranging the cylinders $e$ and $f$, in the manner shown in relation to the strippers $g$ and $h$, in combination with the pinions $i\ i$, and internal gear $r$, so that one internal gear shall drive both strippers, as set forth.

In witness whereof, I have hereunto set my signature, this 8th day of July, 1869.

S. R. PARKHURST.

Witnesses:
   CHAS. H. SMITH,
   GEO. T. PINCKNEY.